United States Patent [19]

Pecar

[11] 3,932,995

[45] Jan. 20, 1976

[54] SYSTEM FOR PRODUCING WORK USING A SMALL TEMPERATURE DIFFERENTIAL

[76] Inventor: Milan Pecar, Ante Kovacica 1, Zagreb, Yugoslavia

[22] Filed: June 17, 1974

[21] Appl. No.: 480,096

Related U.S. Application Data

[63] Continuation-in-part of Ser. No. 241,596, April 6, 1972, abandoned.

[30] Foreign Application Priority Data

Apr. 17, 1971  Germany............................ 2118824

[52] U.S. Cl. ........................ 60/531; 60/675; 60/676
[51] Int. Cl.²............................................ F03G 3/00
[58] Field of Search .............. 60/531, 675, 530, 676

[56] References Cited
UNITED STATES PATENTS

| | | | |
|---|---|---|---|
| 196,759 | 11/1877 | Miller .................................. | 60/675 |
| 1,493,368 | 5/1924 | Merz.................................... | 60/641 |
| 3,100,965 | 8/1963 | Blackburn............................. | 91/4 X |
| 3,608,311 | 9/1971 | Roesel, Jr. ........................... | 60/516 |

*Primary Examiner*—Allen M. Ostrager
*Attorney, Agent, or Firm*—Karl F. Ross; Herbert Dubno

[57] ABSTRACT

The small temperature differential between a warmer zone and a colder zone is exploited to produce work. A brightly volatile fluid is confined within a substantially closed air-free, air emptied chamber in the warmer zone so as to drive the fluid by its own vapor pressure up a tube into an air-free upper end of an air emptied vertical duct in the colder zone to its lower end at the warm zone. As the fluid descends in the duct it passes over and drives a turbine so as to create mechanical work and then flows into another ductward opened chamber. Once all of the fluid has flown out of the one chamber and into the other a pair of conduits between the lower and upper regions of the other chamber and the lower and lower ends of the duct are closed and the corresponding conduits of the first chamber are opened so that the same process can occur in this other chamber.

3 Claims, 2 Drawing Figures

SYSTEM FOR PRODUCING WORK USING A SMALL TEMPERATURE DIFFERENTIAL

CROSS-REFERENCE TO RELATED APPLICATION

This application is a continuation-in-part of my copending patent application Ser. No. 241,596 filed Apr. 6, 1972, now abandoned.

FIELD OF THE INVENTION

The present invention relates to a method of and an apparatus for producing work using a temperature differential. More particularly this invention concerns the exploitation of a small temperature differential such as occurs in nature for the development of energy.

BACKGROUND OF THE INVENTION

It is known to use liquid ammonia to produce work. The liquid ammonia is evaporated at the bottom of a large closed system such that the vapors flow up to the upper, cool end of this system where they are condensed. This condensate flows down to the hot bottom of the system through a turbine or other such device which serves, water-mill fashion, to produce work from the falling liquid. Such a system requires a temperature differential of at least 20°C in order to function and must be relatively large.

It is also known to evaporate a hydrocarbon such as propane having a low boiling point by means of warm surface sea water. The vapor propels a turbine and is condensed by cooler sea water drawn up from well below the surface, whereupon the condensate is again evaporated. Such an arrangement is frequently relatively bulky and requires considerable investment in equipment, along with a particular geographic location. Such power generation requires the turbine or the like to be moved directly by vapor and not by liquid. The condensed propane is pumped from the condenser to the vaporizer so the whole device is extremely large and very expensive.

The exploitation of geothermal energy also presents another potential source of power. This is done by simply driving a turbine with steam issuing from a steam well or the like, or by using the heat at several hundred meters below the surface to boil water. The generated steam is used to drive turbines. Since water has a relatively high evaporation entropy and a correspondingly low vapor pressure it is necessary to drive the turbine with the liquid. Since it is necessary to drill an extremely deep well to obtain a temperature of between 90° and 130°C the cost of such an installation is usually prohibitive.

OBJECTS OF THE INVENTION

It is therefore an object of the present invention to provide an improved method of and apparatus for producing work using a temperature differential.

Another object of this invention is to provide an improved system for exploiting a relatively small temperature differential so as to develop energy.

SUMMARY OF THE INVENTION

These objects are attained according to the present invention in a system where a substantially closed air-free, air emptied chamber is provided in a zone having a temperature higher than a body of highly volatile liquid in the chamber. A tube extends from the bottom of this chamber to the upper end of an air emptied vertical duct in the cooler zone. A turbine, by which is meant any device which transforms a fluid flow to a usuable form of work, is provided in the duct and the lower end of the duct is connected to another ductward opened chamber so that the liquid flowing down the duct turns the turbine and is collected in the other chamber. The vapor pressure in the first-mentioned chamber forces the liquid up the tube so that it drops down the duct and operates the turbine. When all of the liquid has flowed out of the first-mentioned chamber the conduits between the lower and upper ends of the turbine duct and the second chamber are closed and the conduits between the upper and first chamber and the upper end lower end of the duct are opened. Thereupon the second chamber acts just as the first, with the vapor pressure developed therein forcing the liquid up a respective second tube so as to operate the turbine. The condensate flows down the duct into the ductward opened chamber, also operating the turbine. The two chambers, the duct, the two vapor conduits and the four fluid conduits all form a closed air-free air emptied system so that no fluid is lost.

A model made in the laboratory of such an arrangement with a pair of similar 1 liter flasks using 450 milliliters of liquid was so sensitive to small temperature differentials that merely applying a finger to the closed chamber was sufficient to pump this liquid from this chamber into the other.

According to yet another feature of this invention the entire closed system is evacuated so that only the working fluid and its vapor is left in it. In this manner minimum pressure gives a maximum pressure differential between the two chambers. In addition the volume evaporation work in the closed chamber is transmitted to the liquid without loss and this work is simultaneously increased by the negative volume work of condensation also without any losses.

Another advantage of this system over the type using chambers having pistons or bellows allowing variation in volume is that in the present type of system the liquid acts itself as a piston which gives a perfect seal at all times and can adapt to any shape. In addition the friction effective on a liquid is so very low as to be virtually negligible and does not cause any wear so that the volume work is directly transmitted to the turbine without any intermediary.

Thus in accordance with the present invention a pair of such thermoexchanging chambers are used alternately as vaporizer and condenser. In this manner the maximum temperature differential between the propelling liquid and the thermopoles is obtained so that maximum transformation of heat into work is achieved. In such a system the two chambers constitute the greater bulk of the apparatus so that a relatively great amount of work can be produced in a relatively limited space.

The fluid according to the present invention may have a pair of phases, a rapidly volatile actively propelling liquid and another nonvolatile inert liquid. A small quantity of the active working fluid drives a large quantity of the inert one.

The turbine in accordance with this invention is rotated by a liquid, not by a vapor, so that a maximum amount of kinetic energy is exploited. The fluid driving the turbine is only slightly condensed while for the most part the working fluid neither evaporates nor condenses.

In view of the completely contained system the chance of pollution or other deleterious environmental effect is almost completely eliminated.

The apparatus in addition can be used for the distillation and drying of many substances, especially unstable ones, and can be used as a small energy generator usable for instance on a space vehicle or the like. In addition the apparatus according to the present invention provides a particularly vivid representation of the Carnot cycle. Since the system is completely closed it needs no recharging and, since the working and propelling fluids can be completely inoffensive and noncombustible the apparatus is safe and neat.

In the apparatus according to the present invention the pressure head over the fluid in the closed vessel is created by the temperature in the warmer zone either heating and expanding the gas above the liquid, or by heating and vaporizing the liquid. This head forces the liquid up the drive tube or pipette so that it can cascade freely down in the duct, falling on and operating the turbine to produce mechanical work. Since the duct is in the cooler zone the vapor pressure in this duct will be lower than that in the closed vessel or chamber, and any vapor rising in the vapor conduit out of the other chamber, which is open, will be condensed and serve also to operate the turbine.

BRIEF DESCRIPTION OF THE DRAWING

The above and other objects, features and advantages will become more readily apparent from the following description, reference being made to the accompanying drawing in which.

SPECIFIC DESCRIPTION

Figures 1, 2:
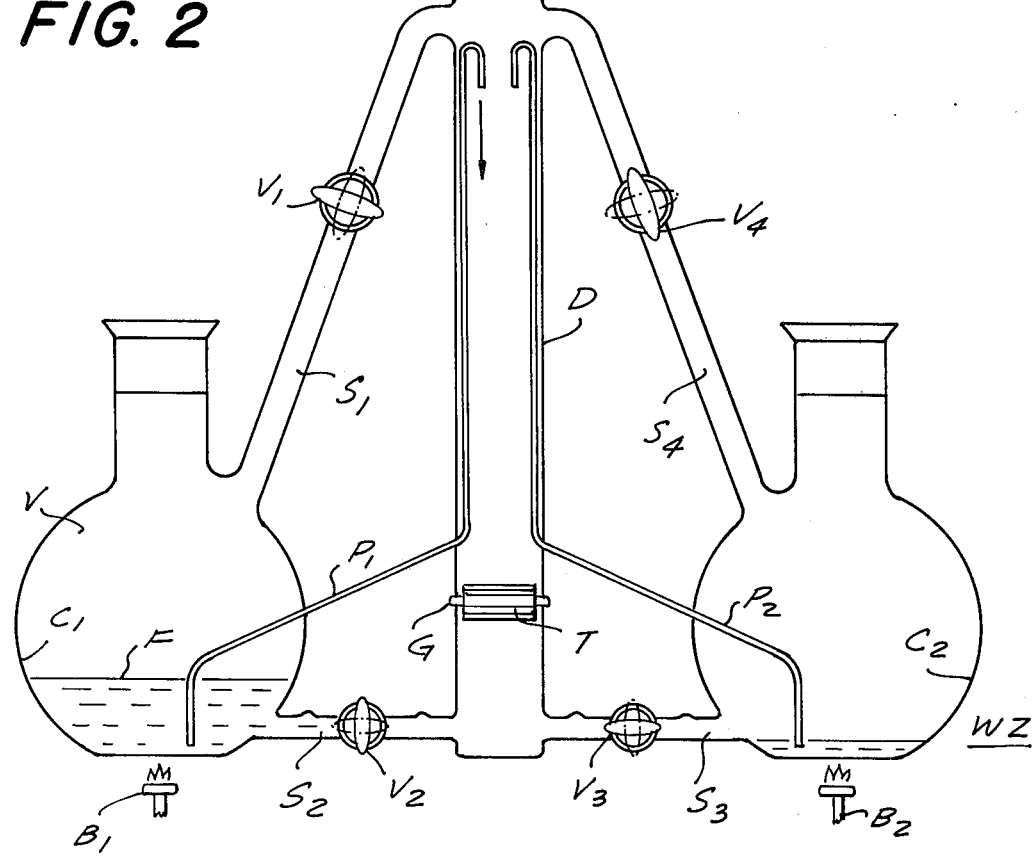
FIG. 1 is a side elevational view of the system according to the present invention.
FIG. 2 is a detail view of an alternative valve arrangement for the system according to this invention.

As shown in FIG. 1 a pair of closed chambers $C_1$ and $C_2$, here each formed by a plugged glass retort, are both located in a warm zone WZ here created with the help of a pair of small burners $B_1$ and $B_2$. A duct D situated between the two chambers $C_1$ and $C_2$ has at least its upper end in a cooler zone CZ created by a cooler K operating with a reflux coil R in the duct D. The upper region of each of the chambers $C_1$ and $C_2$ is connected, via a relatively large-diameter conduit $S_1$ and $S_4$, to the upper end of the duct D. Respective valves $V_1$ and $V_4$ are provided in the conduits $S_1$ and $S_4$ and can be operated to permit vapor flow through these conduits.

A further pair of large-diameter conduits $S_2$ and $S_3$ extend between the lower regions of the chambers $C_1$ and $C_2$ and the lower end of the upright duct D. Respective valves $V_2$ and $V_3$ are provided in these conduits $S_2$ and $S_3$ and can be operated to permit fluid flow through these conduits.

Small-diameter tubes or pipettes $P_1$ and $P_2$ have their lower ends situated at the very bottom of the respective chambers $C_1$ and $C_2$ and their upper ends located at the upper end of the duct D. A small turbine T connected to a generator G is provided adjacent the lower end of duct D.

The system formed by the two chambers $C_1$ and $C_2$, the four conduits $S_{1-4}$ and the duct D, is evacuated and completely closed and air emptied and operates as follows:

To start with the valves $V_2$ and $V_1$ are closed and the valves $V_4$ and $V_3$ are opened. The chamber $C_1$ has been preliminarily filled with a fluid F having a vapor head V and a surface lying above the bottom end of the pipette $P_1$. The warmer zone WZ causes the vapor pressure above the fluid F to increase, thereby forcing this fluid F up the cooler pipette $P_1$ whence it drips down in cooler duct D over the turbine T. This action rotates the turbine and causes the generator G to make electricity. The liquid or condensate so falling then runs through the conduit $S_3$ into the chamber $C_2$. Since the conduit $S_4$ is open it is possible for the fluid level to rise in this chamber $C_2$ well above the conduit $S_3$.

Once the surface level of the fluid F is below the lower end of the pipette $P_1$ the valves $V_{1-4}$ are all reversed into their dot-dash positions. This closes off the conduits $S_3$ and $S_4$ while opening the conduits $S_1$ and $S_2$ so that the process described above now takes place with the fluid F running up the pipette $P_2$ and thence into the chamber $C_1$.

The fluid F used here can be, for instance, acetone and in accordance with the present invention air is excluded from the system. The temperature of the liquid used must lie between the temperatures of the warmer and cooler zones.

FIG. 2 shows how the valves $V_1$ and $V_4$ can be replaced by a single three-way valve $V_5$ which in the illustrated position connects together the conduits $S_1$ and $S_4$. When rotated 90° in one direction from the illustrated position it will close off one of the conduits $S_1$, $S_4$ and open the other; when rotated in the opposite direction it will have the opposite effect.

It is possible in accordance with the present invention to dispense with either the burner $B_1$ or $B_2$ with the cooler K, or even both one of the burners and the cooler where a natural temperature differential exists between the warmer zone WZ and the cooler zone CZ.

The apparatus illustrated in FIG. 1 was used with a pair of 1 liter retorts constituting the chambers $C_1$ and $C_2$ and using 450 milliliters of acetone. Any other fluid having a boiling point below 80°C would also be usable. With a temperature differential between the colder zone CZ and the warmer zone WZ of between 3°C and 14°C it is possible to keep the turbine T rotating continuously. The flow starts when the temperature differential between blue fluid in the chambers $C_1$ and $C_2$ has attained a value of between 0.5° and 0.7°C. Between 0.7 and 27 minutes were needed to pump the fluid out of the one chamber. In fact the apparatus is so sensitive that at normal room temperature using acetone as the fluid with a system evacuated such that the acetone vaporizes at approximately 85°F, it is possible to set the turbine operating simply by placing a finger on the closed retort.

It is similarly possible in accordance with this invention to use a highly pressurized system as e.g. sulfur dioxide, ammonia, chlorine or the like as the working fluid. Otherwise the more volatile solvents such as e.g. the lower hydrocarbons, the ethers, various esters, ketones and alcohols are indicated. For example if liquid ethane is used with a temperature differential from 15° to 34.5°C it is possible to obtain a pressure differential of 17.7 atms, equivalent to a lift of water of 183 meters.

I claim:

1. An apparatus for producing mechanical work using a pair of zones having a temperature differentials between them, said apparatus comprising:

a pair of substantially closed chambers at least one of which is in the high-temperature zone, a fluid having a boiling temperature lying between the temperatures of said zones being disposed in said chambers;

an upright duct at least partially in the low-temperature zone;

a tube extending between a lower region of each chamber and the upper end of said duct;

conduit means extending between each of said chambers and said duct for flow of liquid and gas therebetween, said chambers, duct, tubes, and conduit means constituting a closed system;

valve means in each of said conduit means for alternately blocking and unblocking same, whereby with the valve means of one of said chambers closed and the valve means of the other chamber open, said fluid having a boiling temperature lying between the temperatures of said zones will vaporize in said one chamber and be driven up the respective tube to flow down said duct and through the conduit means of the other chamber into this other chamber; and turbine means in said duct between the ends thereof and operable by liquid flow through said duct for creating mechanical work.

2. A process for producing energy comprising the steps of:

maintaining an air-free chamber containing a fluid having a boiling point less than 80°C and above the lower temperature of two regions having a temperature differential between them at the temperature of the high region, thereby evaporating said fluid thereby creating a pressure within said chamber;

evaporating fluid from said chamber in a space communicating therewith while inducing a flow of liquid of said fluid from said chamber into said space solely by pressure generated within said chamber;

passing the induced continuous flow of liquid through a device performing mechanical work and collecting said liquid and the liquid condensed from the evaporated fluid in another chamber; and thereafter evaporating fluid from said other chamber while inducing the continuous flow of liquid therefrom through said device in the direction in which the same is driven by the liquid from the first-mentioned chamber and collecting liquid traversing the device from said second chamber and liquid condensed in said space from said other chamber in said first chamber, said space being maintained at the temperature at said low temperature region.

3. The method defined in claim 2 wherein at least one of said regions is in heat-exchanging relationship with water.

* * * * *